United States Patent [19]

Leitner

[11] 4,214,459
[45] Jul. 29, 1980

[54] TORQUE TRANSMISSION CLUTCH

[76] Inventor: Kajetan Leitner, Am Winacker 18, 8170 Bad Tölz, Fed. Rep. of Germany

[21] Appl. No.: 935,950

[22] Filed: Aug. 23, 1978

[30] Foreign Application Priority Data

Sep. 1, 1977 [DE] Fed. Rep. of Germany ....... 2739489

[51] Int. Cl.³ ............................................. F16D 43/20
[52] U.S. Cl. ..................................... 64/29; 192/56 R
[58] Field of Search ................. 64/29, 28 R; 192/56 R

[56] References Cited

U.S. PATENT DOCUMENTS

| 1,840,682 | 1/1932 | Scheldrick | 64/29 |
| 2,969,133 | 1/1961 | Langheck | 192/56 R |
| 2,974,535 | 3/1961 | Morris | 64/29 |
| 3,137,187 | 6/1964 | Van Hoose | 64/29 |
| 3,693,381 | 9/1972 | McGee | 64/29 |

FOREIGN PATENT DOCUMENTS

| 740397 | 10/1943 | Fed. Rep. of Germany | 192/56 R |
| 2248421 | 5/1973 | Fed. Rep. of Germany | 192/56 R |
| 2720549 | 11/1977 | Fed. Rep. of Germany | 64/29 |
| 211236 | 4/1968 | U.S.S.R. | 64/29 |
| 280129 | 1/1971 | U.S.S.R. | 64/29 |
| 292037 | 11/1971 | U.S.S.R. | 64/29 |
| 386176 | 9/1973 | U.S.S.R. | 64/29 |
| 450042 | 4/1975 | U.S.S.R. | 64/29 |

Primary Examiner—Ira S. Lazarus
Attorney, Agent, or Firm—O'Brien & Marks

[57] ABSTRACT

A torque transmission clutch which disengages automatically on increase of torque beyond a particular value comprises a pair of like discs mounted to rotate with a drive shaft and a driven shaft respectively, each disc having through-extending apertures accommodating a ring of balls. The balls are all the same size and the number of balls in each ring is the same. The disc thickness is equal to the ball radius and the discs are held axially in a sleeve with a spacing equal to the ball radius. One ring of balls abuts a thrust disc located axially on one shaft and the other ring of balls is pressed by a spring-loaded thrust disc to interengage with the balls of the one ring in the space between the ball-retaining discs. On occurrence of excessive torque, the spring-loaded ring of balls is deflected axially and rides over the balls bearing against the axially-located ring.

7 Claims, 6 Drawing Figures

TORQUE TRANSMISSION CLUTCH

DESCRIPTION

The invention relates to a torque transmission clutch, wherein the transmission of a torque between a drive shaft and a co-axial driven shaft, which are located axially, is effected by two co-axial symmetrical rings of equal-sized balls, each ring having the same number of balls, the balls of one ring engaging under a spring load between the balls of the other ring, the two rings being supported in apertures in discs which are connected respectively to the drive shaft and driven shaft to rotate with the respective shaft and the rings of balls bearing against thrust discs one of which is spring-loaded axially displaceably on the respective shaft.

Such a torque transmission clutch is known from German Patent Specification No. 740397. In this torque transmission clutch one disc is secured by screws to the thrust disc lying behind it. This support disc is formed by a driven gearwheel which rests rotatably in the manner of a sleeve on an axial member, so that the gearwheel undertakes the duty of a drive shaft. The two ball-retaining discs are formed differently, one having its ring of balls bearing against the other so that the two discs are held apart at a given distance. The ball-retaining discs themselves hold the balls in such a way that they are shrouded by more than half their diameter by the discs. As shown in the drawings of this patent specification the balls only project by a third of their diameter from the discs. The result of this is that the balls run against one another from rim to rim at a comparatively flat angle so that in transmitting a torque there is a very strong tendency for the balls to run up one another and thus release the clutch engagement. The torque that can be transmitted by this clutch is therefore correspondingly small. Furthermore the clutch construction is complicated inasmuch as one perforated disc has to be screwed to the drive gearwheel which simultaneously forms the relevant support disc. The other perforated disc is fixed by means of a key to the shaft carrying the gearwheel.

There is also known from U.S. Pat. No. 2,969,133 a torque transmission clutch which comprises one ring of rolling elements in the form of balls and a second ring of the rolling elements in the form of rollers.

The rollers are supported in an apertured disc connected to the drive shaft in such a way as to be compelled to rotate with it, the ring of rollers engaging through this disc against a spring-loaded support disc which is carried by the drive shaft in such a way as to be axially displaceable, so that when overloading occurs the balls can press the rollers axially away until the balls slide away over the rollers to disengage the clutch. The balls are supported in two apertured discs, of which the outer one transmits the torque to the driven shaft while the inner perforated disc, which is between the roller-retaining disc and the outer ball disc, serves to guide the balls in the declutched condition, in which they are led out of the outer ball disc into recesses in the roller disc. The outer ball disc thereby loses contact with the balls so that they are no longer driven with the driven shaft on which the outer ball disc is secured. With regard to the outer ball disc it should further be added that its apertures, although going right through the disc, are so narrow that they can grip the balls without the balls being able to slip through the apertures.

With the known construction therefore three differently formed apertured discs are provided, of which in addition one is not flat but is uneven. The components are therefore comparatively complicated constructionally. Furthermore different rolling elements are used, each requiring its own bearing arrangement. Finally the known torque transmission clutch has the disadvantage that the balls are pressed out of an apertured disc when a given torque is exceeded so that the disc is subjected to a considerable amount of wear at the edges of its apertures.

The object of the invention is to provide a form of torque transmission clutch which, because of the simplicity of design of its constructional components, it is easy to produce and hence is favourable from the cost viewpoint. In addition, while offering a compactness of construction, the maximum possible torque is transmissible without the sensitive constructional components being subjected to inordinate wear.

According to the invention, a torque transmission clutch comprises co-axial driving and driven shafts which are located axially, two rings of equal-sized balls, each ring of balls containing the same number of balls and being held in aperturing in a respective ball-retaining disc having a thickness equal to the ball radius, the discs being alike, a sleeve in which the discs are maintained apart by a distance equal to the ball radius, one of said discs being mounted on the drive shaft to rotate with it and the other of said discs being mounted on the driven shaft to rotate with it, one ring of balls being located axially by a first thrust disc to project from the disc by a distance equal to the ball radius towards the other disc, and the other ring of balls being spring urged through a second thrust disc to project from its respective disc to interengage between the balls of the said one ring.

The torque transmission clutch thus comprises comparatively simple constructional components, that is one size of balls and two equal-sized plane apertured ball-retaining discs which can be stamped or punched out without any difficulty, the same tool being used in each case. As the thickness of the ball-retaining discs corresponds to the radius of the balls it grips them exactly at their equators, so that the balls of the two rings run against one another with their steepest obliquity, thus permitting transmission of a high torque. Also any gripping of the balls below their equators is avoided so that the balls do not have a tendency to be ejected from the discs. If the ball-retaining discs were thicker then the balls would make contact with one another at a flatter angle, so that a less torque would be transmissible. When declutching takes place the balls roll or slide over one another without having any tendency to slide out of the discs, so that the edges of the discs are not subjected to wear due to the balls sliding over them. The balls thus are, as essential components of the clutch, cheap and resistant to wear, and can also be easily interchanged.

In assembly, the thrust discs, the ball-retaining discs with the balls in them and a distance piece are mounted on the drive shaft and the driven shaft, and then the sleeve is pushed over this assembly to hold it together, the assembly being retained axially in the sleeve for example by means of a spring ring mounted in the sleeve. A spring can then be fitted to bear on the second thrust disc.

Advantageously the shafts have zones of polygonal cross-section corresponding to central polygonal apertures in the ball-retaining discs. This polygonal design provides without any special constructional arrangements the necessary rotational connection between the discs and the shafts.

A simple and convenient form for the ball-retaining discs is that in which the aperturing for the balls is formed as lobes extending outwards from the central polygonal aperture, so that in each disc there is only one aperture. Thus a stamping or punching tool of particularly simple construction can be used in the production of the discs. Again, the ball apertures can be disposed at a comparatively small radial distance from the centre axis of the discs, so that altogether a very compact clutch construction is obtained. If the ball apertures are further out fillets or webs have to be left in the discs, which cannot be stamped as thin as would be desired, so that an undesirable increase in size of the clutch would result.

The shafts are preferably made from stock material having a polygonal cross-section. Any necessary turning operations can be effected at the requisite points in this polygonal material. By contrast production of the shafts from circular section material is more expensive, as in this case the polygonal cross-section has to be milled.

According to a feature of the invention, there is provided an aligning member extending co-axially through the shafts and being secured to one of the shafts, and a thrust bearing located the other shaft with respect to the aligning member. The shafts are thus held in their co-axial relationship, and any axial load, for example as may occur in use of the clutch in a drilling machine, is transmitted from the drive shaft via the thrust bearing and the aligning member to the driven shaft.

The ball-retaining discs with their balls and the first thrust disc are advantageously axially retained by the sleeve having an inwardly-directed flange overlapping the first thrust disc to locate it axially, and there being a spring-ring mounted in the sleeve to overlap and retain the disc assembly in the sleeve, and a spacer ring in the assembly between the ball-retaining discs. The sleeve acts to exclude dirt and to retain lubricant.

A particularly compact construction is obtained if the number of balls per ring corresponds to the number of polygonal surfaces. It is possible in this case for the balls to be radially retained by the polygon surfaces.

It is possible to make the diameter of the balls such that the two rings interengage practically without any rotational or torsional play. This dimensioning enables the balls to have as large a diameter as possible, which is also favourable in militating against wear of the balls.

One embodiment of the invention is illustrated by way of example in the accompanying drawings, in which.

Figure 1:
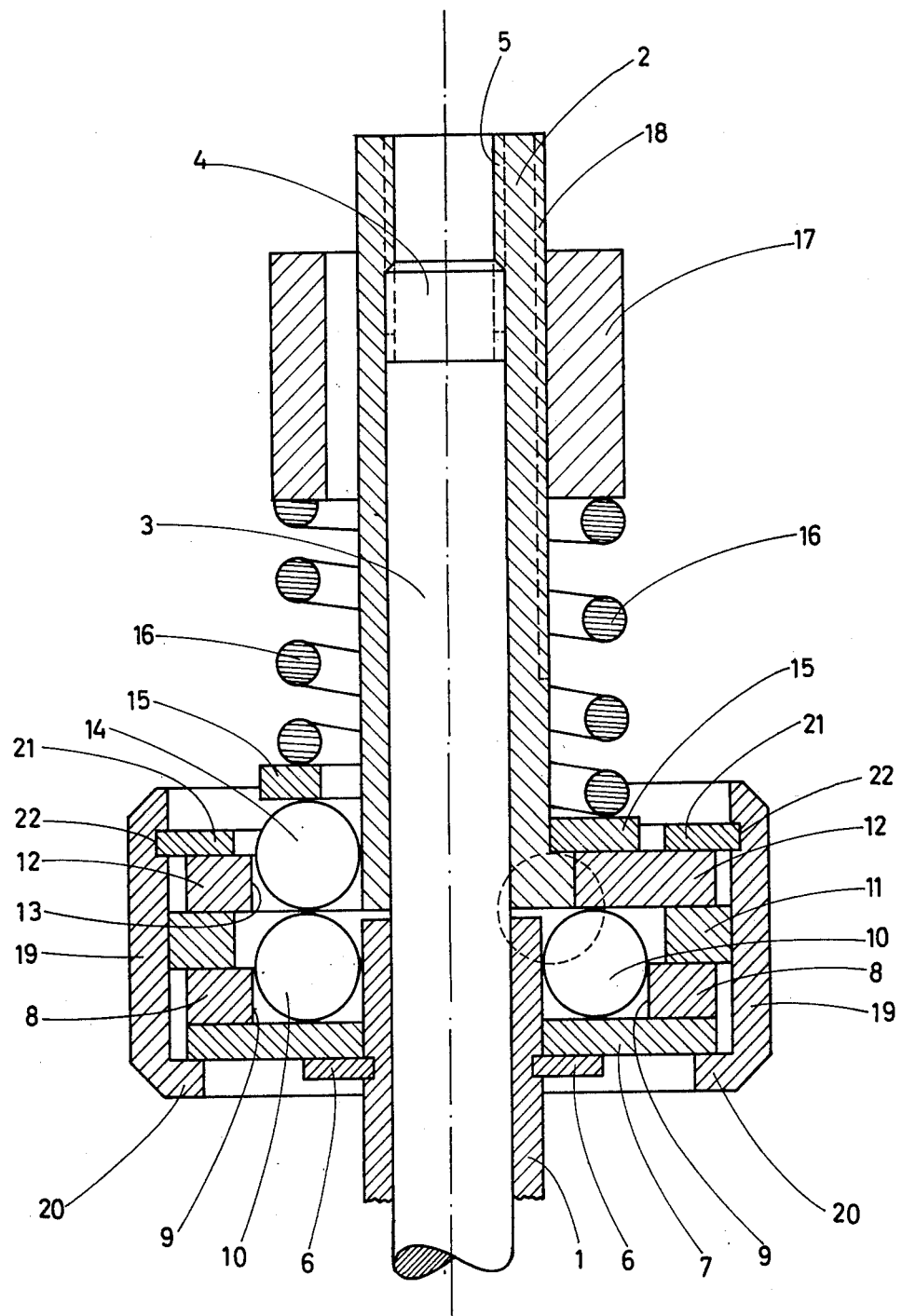
FIG. 1 shows the torque transmission clutch in longitudinal section.

The torque transmission clutch illustrated connects a drive shaft 1 and a driven shaft 2, which are coaxially aligned by a member 3 by extending within them. The aligning member 3 is fixed to the driven shaft 2 in the illustrated assembly by a screwthread 4 on the axial member 3 screwed into the female thread 5 internally of the driven shaft 2. The two screwthreads 4 and 5 are furthermore bonded together. Part of the female thread 5 is left free to allow screwing-in of a tool, for example a screwdriver. The drive shaft 1 is rotatively supported on the axial member 3.

Figure 4:
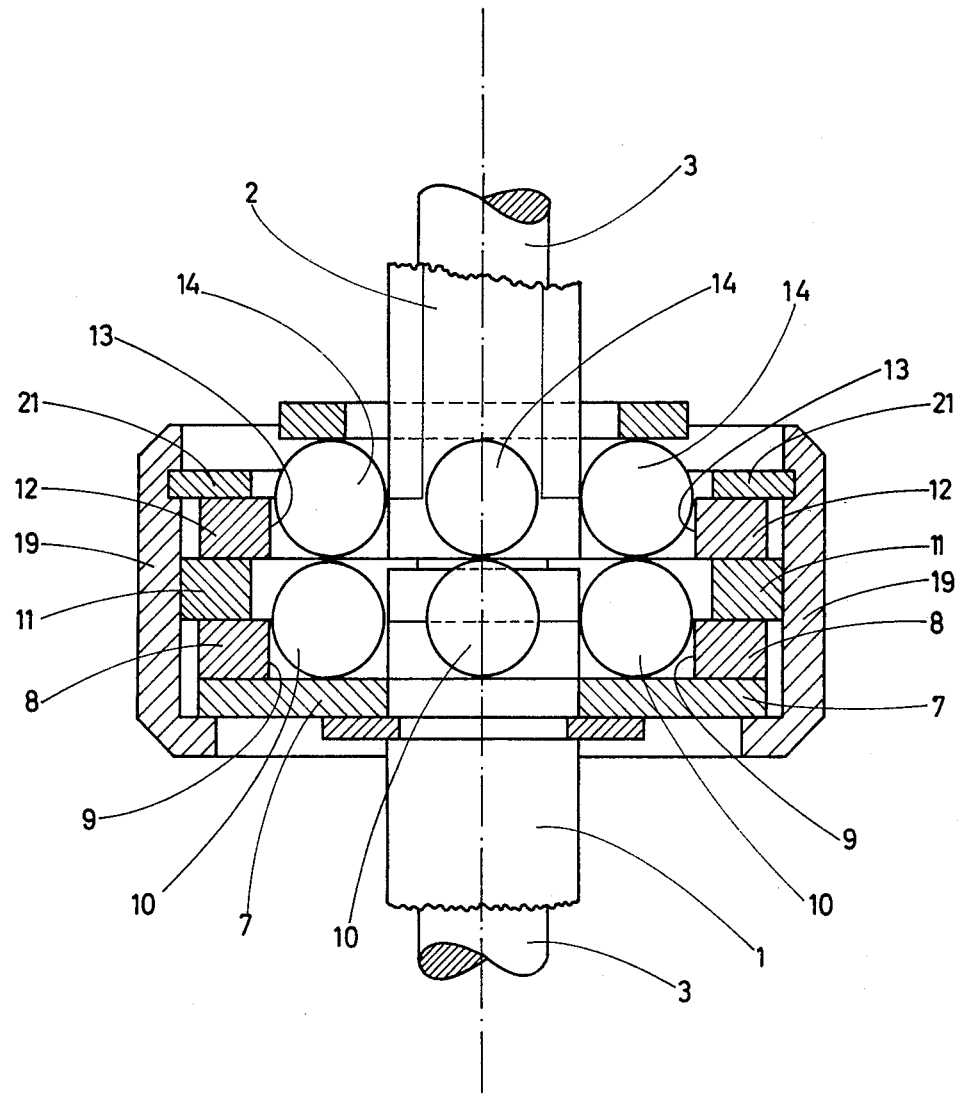
FIG. 4 is a view like FIG. 2 but with the clutch parts in the declutched condition.

The clutch shown not only serves to couple the drive shaft 1 with the driven shaft 2, but also automatically disengages when a given torque is exceeded. In FIG. 1 the clutch is shown engaged on the right-hand side (see also FIG. 2) and is shown disengaged on the left-hand side (see also FIG. 4).

Figure 5:
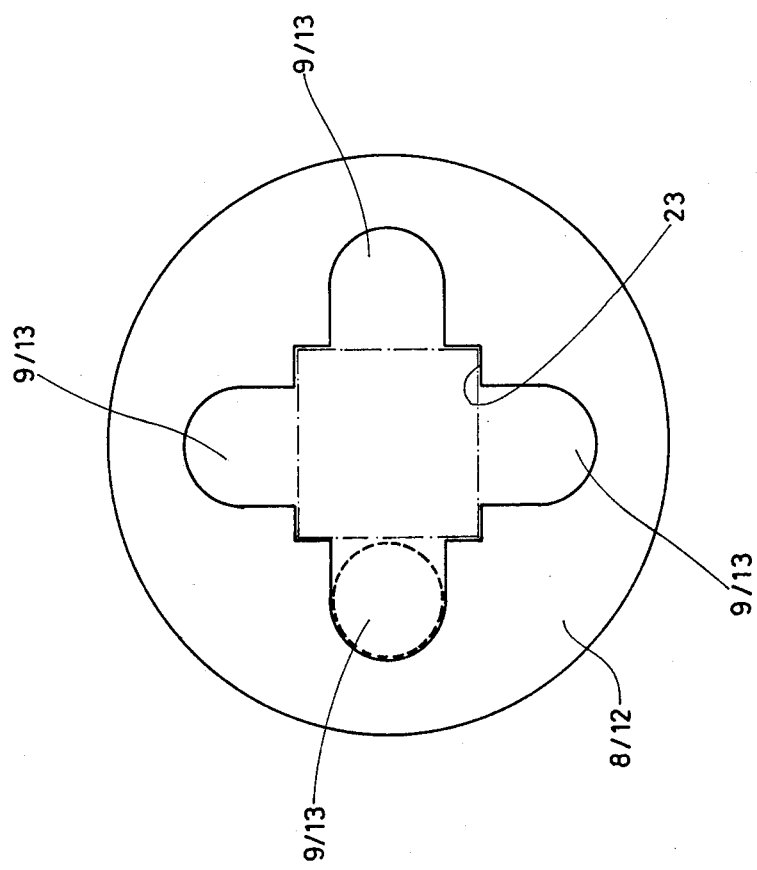
FIG. 5 is a view of a ball-retaining disc.

Mounted in a groove on the drive shaft 1, there is a spring ring 6 which forms an abutment which bears a thrust disc 7 to locate it axially of shaft 1. Bearing against the thrust disc 7 there is a perforated ball-retaining disc 8 which is accommodated on the drive shaft 1, as described hereinafter, such that the disc 8 rotates with the shaft 1. The disc 8 has extending right through it an aperture with a square centre 23 and four symmetrically-disposed lobes 9 (see FIG. 5). Each lobe 9 accommodates a ball 10. Taking as a basis a disc as shown in FIG. 5 there is thus supported in the disc 8 a ring of four balls 10. The disc 8 has a thickness corresponding to half the diameter of the balls 10 and, so that the disc 8 engages the balls 10 precisely at their equators, each lobe 9 has a width corresponding to the diameter of the balls 10. With this arrangement, the balls 10 are constrained to rotate with the drive shaft 1 and disc 8 whilst retained in the axial direction by bearing against the disc 7.

A ring-shaped distance piece 11 bears against the disc 8. The distance piece 11 has a thickness corresponding to the radius of the balls 10 and has a central bore of such diameters that it does not contact the balls 10.

A further perforated ball-retaining disc 12, which is identical to disc 8, bears against the opposite face of the distance piece 11 and accommodates in its aperture lobes 13 a ring of four balls 14. The ball 14 at right-hand side of FIG. 1 is shown in dashed lines since, when the clutch is engaged, it is not visible in the section. When the clutch is disengaged as shown at the left-hand side of FIG. 1, the ball 14 is represented as being visible.

The disc 12 is mounted as described below on the driven shaft 2 in such a way as to rotate with it.

A thrust disc 15 is urged by the pressure of a spring 16 against the disc 12, and an adjusting nut 17 is screwthreaded at 18 on the driven shaft 2 to provide an abutment for the spring so that by rotating the nut 17 the pressure of the spring 16 can be selected.

The assembly comprising the thrust disc 7, the ball-retaining discs 8, 12 and the distance piece 11 are accommodated in a sleeve 19 which on one end has a flange 20 engaging behind the disc 7 and at the other end has an internal groove receiving a spring ring 21 which presses against the disc 12 so that the components of the assembly are maintained in contact.

Since the drive shaft 1 is secured axially with respect to the aligning member 3, the spring ring 6 and the thrust disc 15 ensure that the rings of balls 10 and 14 are pressed against one another so that they assume the position represented on the right-hand side of FIG. 1 (see also FIGS. 2 and 3), the sleeve 19 and spring ring 21 preventing separation of the components 7, 8, 12 and 11 and the spring 16 serving through thrust disc 15 and balls 10 and 14 to hold the thrust disc 7 against the spring ring 6. The sleeve 19 likewise cannot be axially displaced, as it is held firmly against the thrust disc 7.

Figure 3:
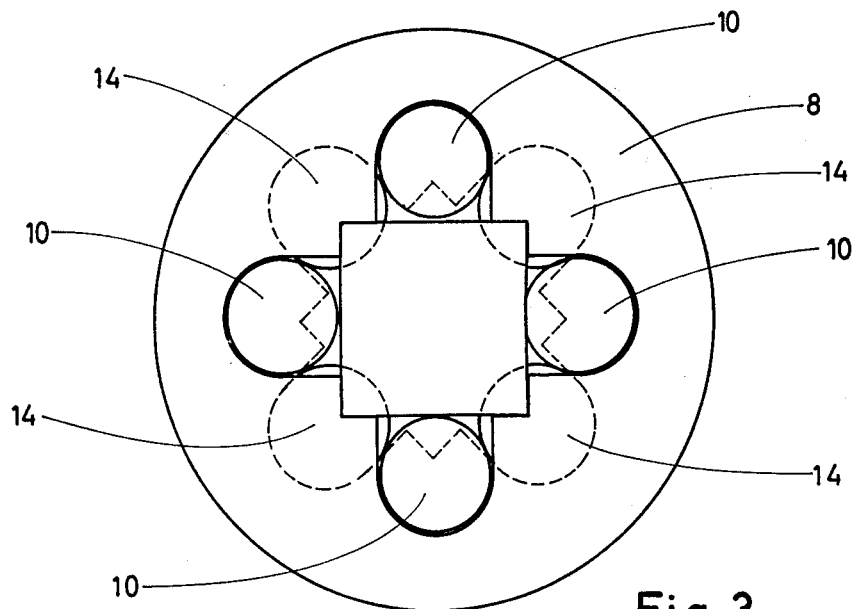
FIG. 3 is a view of parts of the clutch taken on the line A-B in FIG. 2.
Figure 2:
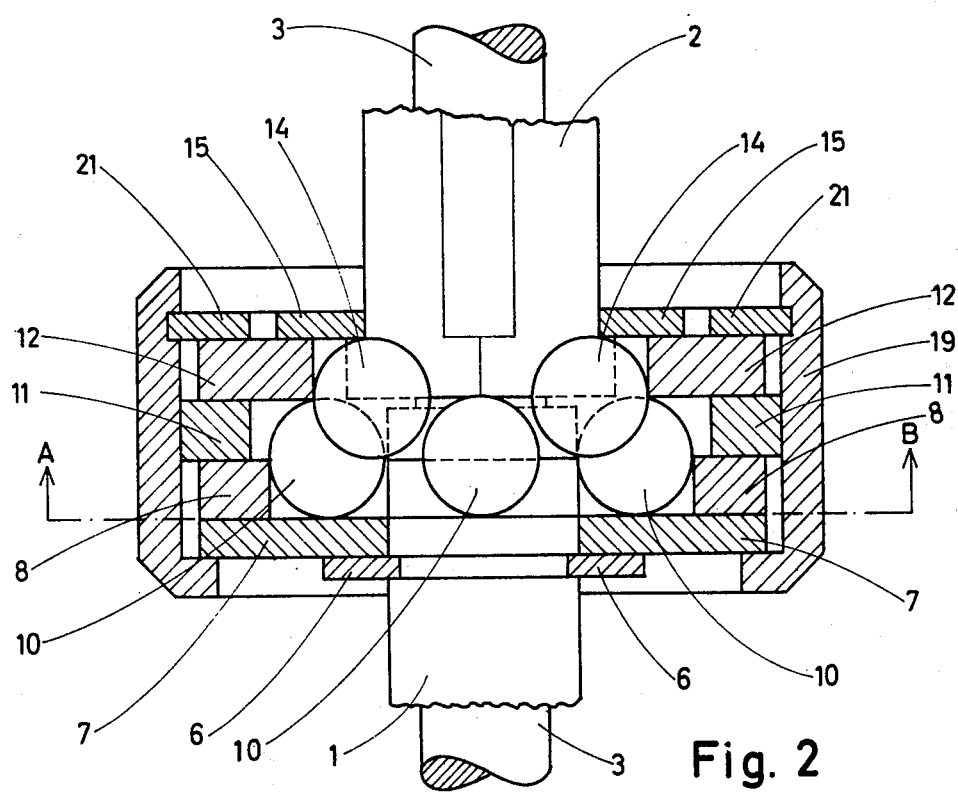
FIG. 2 shows parts of the clutch in their "clutch-engaged" positions.

In FIG. 2 the components of the torque transmission clutch are shown in the clutch-engaged position, thus corresponding to the right-hand part of FIG. 1, in which the four balls 10 interengage between the four balls 14 and are urged under the pressure of the spring 16 to bear against the disc 8 between the lobes 9 of its aperture as indicated in dashed lines in FIG. 3.

When the drive shaft 1 rotates it entrains the disc 8 which in turn entrains the balls 10 which themselves bear laterally against the balls 14 so causing them and disc 12 to rotate. Thus the driven shaft 2 is rotated correspondingly.

If the torque being transmitted by the torque transmission clutch reaches a value at which the balls 10 begin to force the balls 14 away axially, the disc 15 is displaced axially (the other components remain in the position shown in FIG. 2) against the action of spring 16 which is thus compressed. Ultimately if the torque being transmitted exceeds a particular value the balls 10 and 14 reach a position as shown at the left-hand side of FIG. 1 and in FIG. 4 in which the balls can slide over one another so that the drive is interrupted.

When the torque to be transmitted decreases the balls 14 re-enter the gaps between the balls 10 and so are again entrained to restore the drive to the driven shaft 2.

Referring to FIG. 5, it is clear that the discs 8 and 12 accommodate a ball in each aperture lobe 9 or 13 with a slight clearance. The central portion 23 of each aperture is polygonal, here taking the form of a square, and is engaged by a correspondingly shaped portion of the drive shaft 1 or the driven shaft 2 as indicated in FIG. 5 in chain lines, thus ensuring the disc 8 rotates with shaft 1, and that the driven shaft 2 rotates with disc 12. The balls 7 and 14, one of which is indicated in FIG. 5, lie with a slight play against the polygonal portions of the drive shaft 1 or driven shaft 2 respectively, so that the balls are restricted in the radial direction.

Instead of squared shaft portions as above described, the shafts may have for example a triangular or hexagonal cross-section. However if the diameter of the balls is selected such that they interengage practically without any rotational or torsional play, then smaller balls are required with the hexagonal section shafts than with the squared section shafts, which is less favourable for the transmission of high torques. With either arrangement the balls 10 and 14 can when transmitting a drive lie so tightly against one another as to be practically free from play or clearance.

Figure 6:
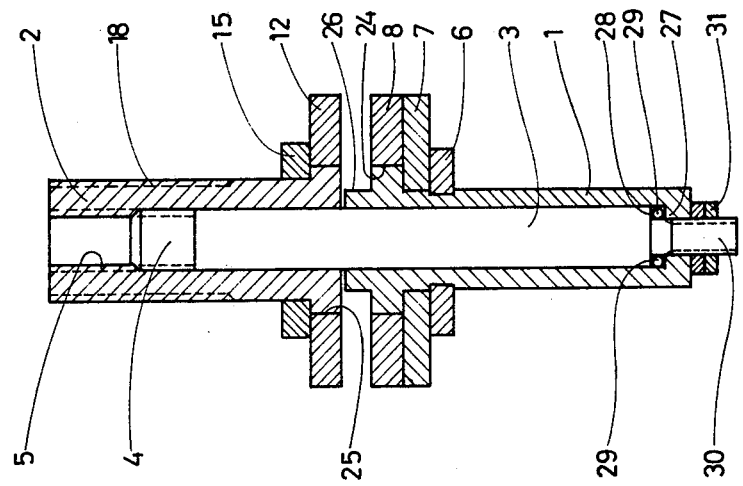
FIG. 6 is a diagrammatic illustration of the drive shaft and driven shaft and clutch assembly with parts removed.

FIG. 6 shows, in assembly, the drive shaft 1, driven shaft 2, the aligning member 3 together with the components accommodated on the shafts 1 and 2. The shafts 1 and 2 are made from square-section stock corresponding to the polygonal aperture seen in FIG. 5. The polygonal cross-section is left intact in zones 24, 25 where the discs 8 and 12 are positioned. In zone 26 of shaft 1 over which the balls 14 project when in the position of FIG. 4, i.e. during declutching, the drive shaft 1 is reduced in size to allow the balls 14 to rotate, the transverse dimension of the zone 26 being not greater than the width of the square stock. It is also possible to produce the clearance necessary for this movement of the balls 14 by providing the zone 24 of the drive shaft 1 at its end so that a gap is left between the shafts 1 and 2 equal in dimension to the radius of the balls. However if the clutch is likely to be subjected to bending forces in use it is advisable to keep the gap between the shafts as small as possible by providing the zone 26 which thus affords a degree of support for the aligning member 3.

In order to enable the drive shaft 1 to be mounted for example in a drill chuck, which normally has three jaws, the drive shaft is shown in FIG. 6 as completely turned down by lathe to the width of the square stock, with the exception of the entrainment zone 24, whereby the drive shaft 1 is for the greater part cylindrical. The thrust disc 7 may then be of an ordinary commercial type having a circular bore. The groove for the spring ring will also be produced on a lathe.

The driven shaft 2 likewise has part turned on a lathe to be provided with the male screw thread portion 18 for the nut 17. The drive shaft 2 is shown to have a greater diameter than the drive shaft 1.

As above described, the aligning member 3 is screwed into the driven shaft 2 and is firmly anchored to it for example by bonding, so giving a rigid connection between them. To locate the drive shaft 1 axially, the drive shaft 1 has a collar 27 aligned with a shoulder 28 on the member 3 and a ring of bearing balls 29 is disposed between the collar 27 and shoulder 28 to form an axial thrust bearing. An axial pressure exerted on the drive shaft 1, for example coming from a drill chuck, is therefore transmitted via this axial thrust bearing to the axial member 3 and thus to the driven shaft 2. To prevent member 3 from being drawn out of the drive shaft 1, the axial member 3 has a threaded extension 30 receiving two lock nuts 31. The lock nuts 31 also take up the pressure exerted by the spring 16 which creates tension between the drive shaft 1 and member 3.

Instead of the female thread 5 for receiving a screwdriver, an internal hexagon may be provided to accommodate a corresponding counter-component of the screwdriver to be held in known manner by springs.

I claim:

1. A torque transmission clutch comprising coaxial driving and driven shafts which are located axially and which are generally hollow, two rings of equal-sized balls, each ring of balls containing the same number of balls and being held in apertures in a respective ball-retaining disc having a thickness equal to the ball radius, the discs being alike, a sleeve in which the discs are maintained apart by spacer means a distance equal to the ball radius, one of said discs being mounted on the drive shaft to rotate with it and the other of said discs being mounted on the driven shaft to rotate with it, one ring of balls being located axially by a first thrust disc to project from the disc by a distance equal to the ball radius towards the other disc, the other ring of balls being spring urged through a second thrust disc to project from its respective disc to interengage between the balls of the said one ring and, an aligning member extending co-axially into said driving and driven shafts and being secured to one of said shafts.

2. A torque transmission clutch according to claim 1, wherein said shafts have zones of polygonal cross-section and wherein the apertures for receiving the balls is formed as lobes of the central polygonal aperture extending outwards therefrom.

3. A torque transmission clutch according to claim 1, the shafts being formed from stock material having the polygonal cross-section.

4. A torque transmission clutch according to claim 2, wherein the number of balls in a ring equals the number of surfaces of the polygonal zone of the respective shaft and the balls lie on these surfaces.

5. A torque transmission clutch according to claim 1 or 2 comprising a thrust bearing locating the other shaft with respect to the aligning member.

6. A torque transmission clutch according to claim 5, wherein the aligning member is secured to the driven shaft and is located with respect to the drive shaft by the thrust bearing.

7. A torque transmission clutch according to claim 1, 2 or 6, the sleeve having an inwardly-directed flange overlapping the first thrust disc to locate it axially, and there being a spring-ring mounted in the sleeve to overlap and retain in the sleeve the disc assembly including said discs and the spacer means therebetween.

* * * * *